April 7, 1931.  F. F. READ  1,799,604
METHOD AND APPARATUS FOR IDENTIFYING CRYSTALS
Filed Nov. 3, 1926   2 Sheets-Sheet 2

Inventor
FAYETTE F. READ
By Frank E. Haskell
Attorney

Patented Apr. 7, 1931

1,799,604

UNITED STATES PATENT OFFICE

FAYETTE F. READ, OF HOLYOKE, MASSACHUSETTS

METHOD AND APPARATUS FOR IDENTIFYING CRYSTALS

Application filed November 3, 1926. Serial No. 146,057.

My invention relates to a method and apparatus for identifying precious gems and crystals being particularly of value in connection with cut diamonds. There have been methods suggested and devised heretofore for identifying such precious stones but they have not been completely satisfactory although a completely satisfactory method would be of great value to lapidaries, insurance companies, police and custom officials, and the owner himself. Some of these methods involve measurements of form, dimensions, volume, weight, density, color, index of refraction and various methods of determining defects or irregularities.

The chief difficulty with all previous methods has been that among a large number of gems the same combination of identifying characteristics would recur many times, at least so far as means known to the prior art would be capable of distinguishing. In other words they failed to individualize a gem.

My method in an entirely novel way determines for each gem a combination of characteristics that is clearly distinguishable from a combination of characteristics similarly determined for any other gem. That is, two gems practically identical as far as all previous methods would indicate, would by my method have such different combinations of characteristics that they would be individualized.

By this method it will be possible to establish registry bureaus in this and other countries whereby it will be possible for a diamond or other crystal to be tested, identified and recorded as to ownership and transfers of ownership. By "identified" wherever used in this specification I mean not merely determining the class such as natural or artificial in which the diamond falls but I mean distinguishing it from all other diamonds of the same class even. no matter how narrow that class may be. That is, by identified, I mean individualized. My invention will thereby make it possible to determine whether a certain crystal is the one which has been lost or stolen. There are many other obvious advantages to be derived from my invention as employed to identify diamonds and other crystals for registration in a system of registry bureaus.

It is well known that when a ray or small beam of light strikes a diamond, for example, a number of secondary rays are emitted both reflected and transmitted. By means of suitable targets or screens I locate the positions of such rays and have found that two diamonds identical according to other tests will give markedly different locations for such secondary rays.

Another general description of my invention would be to say that no two diamonds if measured sufficiently accurately would be found to have precisely the same dimensions and angles. Such differences, however, are too minute to be readily determined, if at all, by ordinary means. But by the use of the light rays I am able to make such differences very noticeable and measurable and to do so in a very simple and expeditious manner.

In order to more clearly explain my invention I have shown one embodiment thereof in the accompanying drawings but I do not wish to confine myself to the exact form shown therein except as limited in the accompanying claims.

Figure 1:
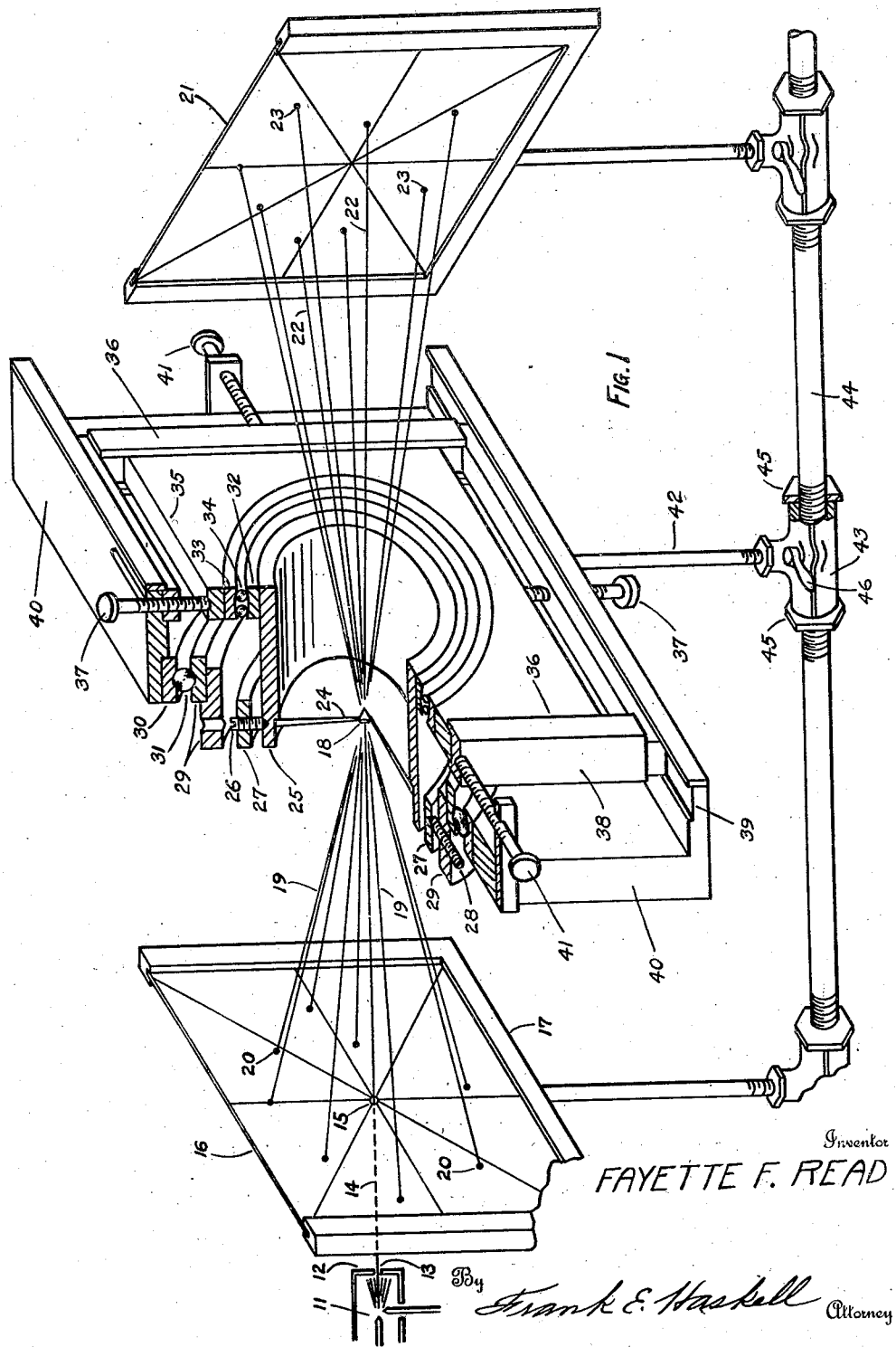
Fig. 1 shows the apparatus set up for use.

Proceeding to a more detailed description, 11 is a source of light. Although an arc lamp is shown it is obvious that any other source of light either with or without lenses and reflectors may be used without departing from the spirit of my invention including natural light or ordinary daylight. 12 is a shutter in front of 11 having a small aperture 13 therein. The ray or beam of light 14 passes through the aperture 13 and then passes through the aperture 15 in target 16 carried in the frame 17. The diamond is shown at 18 and the ray of light 14 striking the diamond 18 is broken up and emitted in a number of secondary rays. Some of these return toward the target 16 as shown at 19, 19 and strike the target at a number of different places as indicated at 20, 20. Other secondary rays pass through the diamond and on to another target 21. These rays are shown at 22, 22 and strike the target as indicated at 23, 23. In general these rays are scattered or dispersed over a considerable area. They do not follow a path approximately parallel to the incident ray of light but diverge at large angles making a cone of rays with a broad apex angle.

In general the bending or deflection of the incident ray into a different direction takes place at the surfaces of the crystal and may be a deflection due to reflection or due to refraction. The target on the same side of the diamond as the source of light, namely target 16, may in the case of some crystals receive rays reflected directely from the outer surfaces of the crystal without the incident ray entering into the crystal. More commonly, the incident ray passes into the crystal and is reflected from the back surfaces thereof. The chief deflection is probably due to this reflection but there may also be some deflection due to refraction as the light passes into and out of the crystal. Likewise the secondary rays which are received on target 21 may be bent or deflected by refraction or they may be reflected from the rear surfaces, return to the front surfaces, and be again reflected before finally emerging from the crystal. A full understanding of the precise way in which the rays are bent or deflected at the surfaces of the crystal is not necessary in order to practice the invention in a practical way and it is to be understood that the theory discussed in this paragraph is merely explanatory and is by no means to be considered as of the essence of the invention. It is also probable that the incident ray is a sheaf of incident rays each of which passes through its own series of deflections before emerging as a certain secondary ray. It is also to be understood that while a definite number of secondary rays are discussed hereinafter there are also a large number of other secondary rays and of different degrees of brightness, the different degrees of brightness probably being due to double, triple or a greater number of reflections before final emergence. These fainter secondary rays may also be used for purposes of identification although they are not ordinarily necessary.

It will be readily seen that the precise positions of these different secondary rays both reflected and transmitted will depend on the form or cutting of the diamond, as well as any imperfections in same. Differences too minute to be measured by ordinary means will be magnified and result in markedly different positions 20, 20 or 23, 23 of the secondary rays on the targets. It is not sufficient, however, to show that differences can be indicated. It must be possible to duplicate a set of readings so that when the same diamond is again tested it will have the same readings and will therefore be known to be the same one. For this purpose some adjustments are necessary. The particular device I have used for obtaining these adjustments may be described as follows:

The diamond 18 is provided with some suitable form of holder. A simple holder I have used is merely a disc of paraffin 24 with a hole in the center thereof. It is obvious that a holder with more refined adjustments, for example such as those on miscroscope stages permitting an object to be moved in one plane in two directions at right angles to each other, may be used instead of the disc. Holder 24 is carried by one end of a cylindrical tube 25. This tube 25 is provided with special adjustments at each end. The adjustments at the front end or end nearest the source of light will be described first. Two vertical supports or pivots 26, only one of which can be seen in the drawing, are in approximately the same plane with the paraffin disc 24 and permit rotation around a vertical axis which passes through the diamond itself. These pivots are merely screws passing through a supporting ring 27 which in turn is supported by two horizontal pivots 28, only one of which can be seen in the drawing, similar to pivots 26. These pivots 28 are carried by ring 29. In the same way as pivots 26 permit rotation around a vertical axis passing through the diamond so pivots 28 permit rotation around a similar horizontal axis passing through the diamond itself. In such a movement not only the diamond 18 but the paraffin disc 24, the tube 25, and the ring 27 partake of the movement around the horizontal axis. Ring 29 is located inside an annular support 30 and a set of ball bearings 31 permits free rotation of ring 29 around its own axis but otherwise ring 29 is rigidly held by support 30.

The adjustments provided at the rear end of the tube 25 which is farthest from the light source is as follows: 32 is the inner race of a self-aligning ball bearing and is slidably mounted on tube 25. 33 is the outer race of the same self-aligning ball bearing and is rigidly fastened to the support 35. 34 indicates the balls of the ball bearing. Support 35 is adjustable vertically in the guides or ways 36, 36 and such adjustment is obtained by means of the screws 37, 37. The guides or ways 36, 36 are carried by the support 38 which is slidable horizontally in the ways 39 of the main frame 40. Such adjustment is made by means of screws 41, 41.

The operation of these adjustments is as follows: The tube 25, together with rings 27 and 29, may be rotated around its own axis within ball bearing 32, 33, 34 and ball bearing 29, 30, 31. This will rotate the diagram of light spots thrown on the target. Also a more important adjustment is as follows: The rear end of the tube 25 may be moved either horizontally or vertically by means of adjusting screws 41, 41 or 37, 37 respectively. In so doing the front end of the tube will rotate about either or both of the pivots 26, 26 or 28, 28. But in either case the axis of rotation will be approximately through the diamond itself which will therefore still remain in the path of light ray 14, but its axis will change direction. Screws 37, 37 and 41, 41 therefore provide adjustment around two sets of coordinate axes, in a plane approximately perpendicular to the incident ray of light whereby the diamond may be pointed in any direction. In this case the two coordinate axes are at right angles to each other but this would not be absolutely necessary. To secure the best position for duplication of previous readings the adjustment should be continued until the axis of the diamond coincides with the incident ray of light, 14. This will generally be indicated by a spot of light striking screen 16 at the aperture 15. It will be noticed that in screws 37, 37 and 41, 41 I have provided micrometer adjustments of a high degree of refinement. Thus a slight turning of screws 37, 37 which carried them downward one-thousandth of an inch might move the outer edge of the diamond less than one-hundredth of the distance the screw had moved.

I have also provided other adjustments for each screen and the diamond holding device. As all three are alike only one will be described. The diamond holding and adjusting mechanism is carried on a support 42. An adjusting and clamping device 43 carries the support 42 and in turn is carried by the main support 44. 44 is threaded and at each end of 43 nuts 45, 45 are provided so that by turning these nuts 43 may be moved along support 44. A clamping handle 46 is provided for firmly securing 43 in place after nuts 45, 45 have moved it into the proper position. Similar nuts and clamping handle are provided for adjustment along support 42 but these are not shown in detail.

It will thus be seen that by means of 43 and its adjustments frame 40 may be moved in any direction and diamond 18 may be brought into the path of the ray of light 14. Thereafter without moving 18 in its location it may be turned about its own axis by means of adjustments 37 and 41 as already explained.

While there are many different ways of recording the positions of the secondary rays of light one method which I have used may be explained by reference to Fig. 2. Around the center or aperture 15 of target 16 are drawn a number of radial lines spaced at equal angular intervals. While any number of these radial lines may be used I prefer eight, numbered as shown from 1 to 8. Each angular interval is again divided into a number of subdivisions, preferably eight, as shown between 8 and 1. These subdivisions may be drawn or may be estimated. Still further subdivisions of these may be made according to the decimal system but I have found that tenths is accurate enough for all practical purposes.

There are also a number of circles drawn around the aperture 15 of target 16. These are given a series of numbers, for example, 1 to 10 as shown on the drawing. Intermediate positions between these circles are measured as decimal fractions.

Proceeding now to a more detailed description of recording the positions of these rays, ray 47 is on the line 8 and its radial position is therefore 800. Its circular position is two-tenths of the distance from circle 9 to circle 10 and its circular position is therefore 92. For convenience this may be written $$\frac{800}{92.}$$

Ray 48 is to the right of radius 8 and also sub-radius 7 and about nine-tenths of the remaining interval to the next radius or sub-radius. Its radial position is therefore 879. Its circular position is about eight-tenths of the distance between circle 8 and circle 9 and its circular position is therefore 88. The position of ray 48 may therefore be written $$\frac{879}{88.}$$

Proceeding in a similar manner with the remaining rays 49, 50, 51, 52, 53 and 54 the entire target and its rays may be recorded as $$\frac{800}{92} \quad \frac{879}{88} \quad \frac{179}{85} \quad \frac{268}{85} \quad \frac{400}{85} \quad \frac{500}{89} \quad \frac{600}{90} \quad \frac{702}{88}$$

Figure 2:
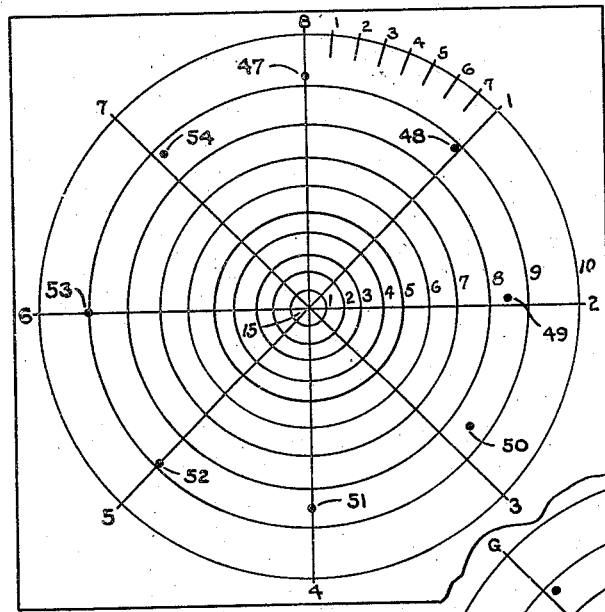
Fig. 2 shows the manner in which the secondary rays of light fall on a target or screen. Also by means of Fig. 2 one method of recording these characteristic positions may be explained.
Figure 3:
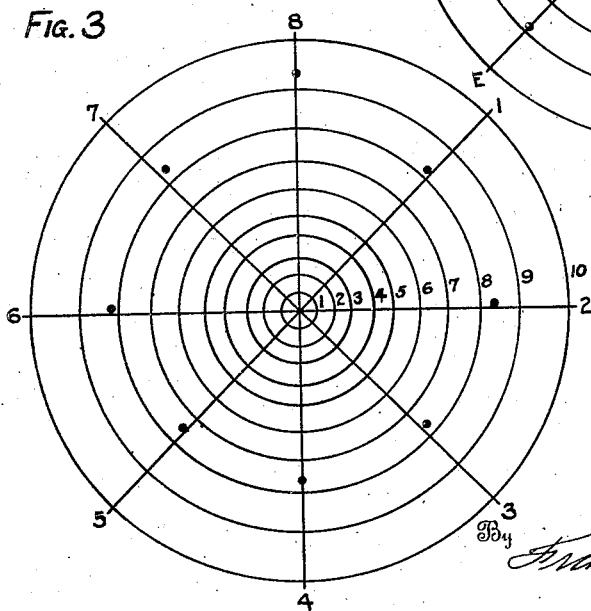
Fig. 3 is like Fig. 2 but omits the target or screen and shows on the chart used the characteristic positions of the secondary rays for another diamond.

Fig. 3 shows the actual position of the rays from another diamond from that of Fig. 2 and recording these indications in the same manner the figures will be $$\frac{800}{93} \quad \frac{878}{82} \quad \frac{179}{84} \quad \frac{278}{77} \quad \frac{400}{77} \quad \frac{501}{75} \quad \frac{602}{82} \quad \frac{704}{83}$$

While these two sets of figures are very different they were obtained from two diamonds considered exactly alike according to all ordinary methods of measurement.

Figure 4:
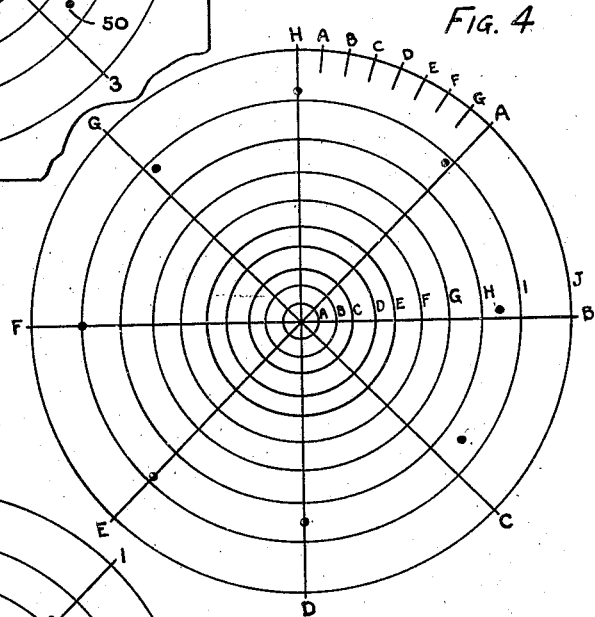
Fig. 4 illustrates how letters rather than figures may be used for recording the distribution or arrangement of the secondary rays of light.

For certain purposes, such as sending code telegrams or cablegrams it is desirable to use letters rather than figures. Fig. 4 shows the rays of the same diamond as Fig. 2 but the positions of these rays are indicated by means of letters instead of numerals. The entire record of Fig. 4 may be given in a four-word code message, each word consisting of ten letters as follows:

HXXIBHGIHH AGIHEBFHHE
DXXHEEXXHI FXXIXGXBHH

It is obvious that there are many other combinations of numerals and letters and arrangements of the targets which may be used without departing from the spirit of my invention. Also the use of photographic records of the rays is a method I contemplate as within the scope of my invention. In the use of the word light I do not wish to confine myself in either specification or claims to a meaning narrower than the obvious scope of the invention. For example both infra-red and ultra violet rays are invisible to the eye and yet could be readily used for my purpose. In fact the latter would be particularly adapted to making photographic records. I also contemplate as within the generic scope of my invention other less common rays such as cathode rays, Röntgen rays, and Becquerel rays. In neither the methods described above or the photographic method is it essential that the chart be a part of the target but it may be a separate device used for the purpose of making the measurements. In the photographic method the fainter secondary rays hereinbefore mentioned are readily recorded along with the secondary rays of the first order of brightness and may be utilized at any subsequent time if so desired. The brighter spots are ordinarily the only ones used but the others are automatically recorded without extra effort or cost and are available when required.

It is to be understood that the above described embodiment of the invention is for the purpose of illustration only and various changes may be made therein without departing from the spirit and scope of the invention as defined in the appended claims.

I claim:

1. A method of identifying or individualizing crystals of a type capable of emitting a plurality of separate and distinct secondary rays of light from a single incident ray, comprising the projection of a ray of light into the crystal to be identified whereby the crystal emits a plurality of separate and distinct secondary rays, the receiving of the emitted rays on a target and the measurement of the positions of said secondary rays.

2. A method of identifying or individualizing crystals of a type capable of emitting a plurality of separate and distinct secondary rays of light from a single incident ray, comprising the projection of a ray of light into the crystal to be identified, whereby the crystal emits a plurality of separate and distinct secondary rays, the receiving of the emitted rays on a target and the recording of the positions of said rays.

3. A method of identifying or individualizing crystals of a type capable of emitting a plurality of separate and distinct secondary rays of light at wide angles from an incident ray, comprising the projection of a ray of light into the crystal to be identified for the purpose of producing the characteristic emission of a plurality of separate and distinct secondary rays at wide angles from the original ray, receiving the emitted rays on a target, and the measurement of their characteristic positions.

4. A method of identifying or individualizing crystals of a type capable of emitting a plurality of separate and distinct secondary rays of light at wide angles from an incident ray, comprising the projection of a ray of light into the crystal to be identified for the purpose of producing the characteristic emission of a plurality of separate and distinct secondary rays at wide angles from the original ray, the receiving of the emitted rays on a target, the adjustment of said crystal to a standard position, and the measurement of the characteristic positions of said secondary rays.

5. A method of identifying or individualizing crystals of a type capable of emitting a plurality of separate and distinct secondary rays of light at wide angles from an incident ray and a single secondary ray centrally located with respect to the other secondary rays, comprising the projection of a ray of light into the crystal to be identified for the purpose of producing the characteristic emission of a plurality of separate and distinct secondary rays at wide angles from the original ray and a single ray centrally located with respect to the other secondary rays, the receiving of the emitted rays on a target, the adjustment of the crystal to that position which will cause the central ray to coincide with the original ray, and the measurement of the characterstic positions of said secondary rays.

6. In a device for indentifying crystals capable of emitting a plurality of separate and distinct secondary rays of light from a single incident ray, means for holding the crystal to be indentified, means for projecting a ray of light into said crystal, said crystal holding means permitting rotation of the crystal on an axis approximately parallel to the ray of light and also about an axis substantially perpendicular to the ray of light, and a target for receiving directly the rays of light emitted from said crystal.

7. In a device for identifying crystals capable of emitting a plurality of separate and distinct secondary rays of light from a single incident ray, means for holding the crystal to be identified, means for projecting a ray of light into said crystal, said crystal holding means being adjustable to bring the crystal within the path of said ray of light, and also adjustable to change the direction of the rays of light emitted from the crystal, and also adjustable to permit rotation of the crystal on an axis approximately parallel to the ray of light, and means for receiving the rays of light emitted from said crystal.

8. A method of measuring crystals of a type having a plurality of surfaces at various angles to each other, comprising introducing light to a plurality of such surfaces simultaneously and measuring the various deflections given by said surfaces to the light.

9. In a device for identifying crystals capable of emitting a plurality of separate and distinct secondary rays from an incident ray, means for holding the crystal to be identified, means for projecting a ray of light into said crystal, said crystal holding means having micrometer adjustments around two coordinate axes whereby the emitted rays may be changed in any direction and a target for receiving the rays of light directly as emitted from said crystal.

10. In a device for indentifying crystals capable of emitting a plurality of separate and distinct secondary rays of light from an incident ray, means for holding the crystal to be identified, means for projecting a ray of light into said crystal, said crystal holding means having micrometer adjustments around two coordinate axes, each axis passing through the crystal itself whereby the emitted rays may be changed in any direction and a target for receiving the rays of light directly from said crystal.

11. In a device for identifying crystals capable of emitting a plurality of separate and distinct secondary rays of light from an incident ray, means for holding the crystal to be identified, means for projecting a ray of light into said crystal, said crystal holding means being adjustable with micrometer adjustments around two coordinate axes each axis passing through said crystal approximately perpendicular to said ray, and a target for receiving the rays of light directly as emitted from said crystal.

12. In a device for indentifying crystals capable of emitting a plurality of separate and distinct secondary rays of light from an incident ray, means for holding the crystal to be identified, means for projecting a ray of light into said crystal, said crystal holding means being adjustable to bring said crystal within the path of said ray and also adjustble around two coordinate axes each axis passing through said crystal approximately perpendicular to said ray, a target for receiving the rays of light emitted from said crystal and means for adjusting the distance between said crystal holding means and said target.

13. A method of identifying or individualizing crystals having a plurality of surfaces at various angles to each other, comprising the projection of ray of light into the crystal to be identified, the receiving on a target of the scattered images of the source of light deflected by the surfaces of the crystal to be identified and using the pattern shown on the target to identify the crystal.

14. A method of identifying or individualizing crystals having a plurality of surfaces at various angles to each other, comprising the projection of a ray of light into the crystal to be identified, the receiving on a target of the scattered images of the source of light deflected by the surfaces of the crystal to be identified and the recording of the pattern shown on the target.

15. A method of identifying a crystal capable of emitting a plurality of separate and distinct secondary rays from an incident ray, comprising the projection of a ray of light into the crystal to be identified for the purpose of producing the characteristic emission of a plurality of separate and distinct secondary rays, the receiving of the emitted rays on a target, and the comparison of the pattern appearing on the target with a record previously made to determine whether the crystal under test is the same one previously tested and recorded.

16. In a device for identifying crystals capable of emitting a plurality of separate and distinct secondary rays from an incident ray, means for holding the crystal to be identified, means for projecting a ray of light into said crystal, said crystal holding means being adjustable for changing the angle between the axis of the crystal and the incident ray of light in any direction while permitting both incident and emitted rays an uninterrupted path, and a target for receiving the emitted rays directly from the crystal.

17. In a device for identifying crystals capable of emitting a plurality of separate and distinct secondary rays of light from a single incident ray, means for holding the crystal to be identified, means for projecting a ray of light into said crystal, said crystal holding means permitting rotation of the crystal on an axis approximately parallel to the ray of light, and means for simultaneously receiving the rays of light emitted from said crystal.

18. In a device for identifying crystals capable of emitting a plurality of separate and distinct secondary rays of light from a single incident ray, means for holding the crystal to be identified, means for projecting a ray of light into said crystal, said crystal holding means being adjustable to bring the crystal within the path of said ray of light, and also adjustable to change the direction of the rays of light emitted from the crystal, and also adjustable to permit rotation of the crystal on an axis approximately parallel to the ray of light, and means for simultaneously receiving the rays of light emitted from said crystal.

19. In a device for identifying crystals capable of emitting a plurality of separate and distinct secondary rays from an incident ray, means for holding the crystal to be identified, means for projecting a ray of light into said crystal, said crystal holding means having micrometer adjustments around two coordinate axes whereby the emitted rays may be changed in any direction, and means for simultaneously receiving the rays of light emitted from said crystal.

20. In a device for identifying crystals capable of emitting a plurality of separate and distinct secondary rays of light from an incident ray, means for holding the crystal to be identified, means for projecting a ray of light into said crystal, said crystal holding means being adjustable with micrometer adjustments around two coordinate axes each axis passing through said crystal approximately perpendicular to said ray, and means for simultaneously receiving the rays of light emitted from said crystal.

21. Apparatus for identifying a crystal of a type having a plurality of angularly disposed surfaces capable of reflecting a single incident ray of light into a plurality of secondary rays at widely divergent angles with each other comprising means for holding the crystal, a target positioned at a predetermined distance from said crystal and having an aperture therein and substantially central thereof, and means for sending a ray of light through said aperture to said crystal and thence back to the target in a plurality of different directions, said target and said crystal holding means being so supported as to permit the diverging secondary rays to pass through an unobstructed field from the crystal to the target.

22. Apparatus for identifying a crystal of a type having a plurality of angularly disposed surfaces capable of deflecting a single incident ray of light into a plurality of secondary rays at widely divergent angles with each other comprising means for holding the crystal, a source of light positioned on one side of said crystal holding means, and a target positioned at a predetermined distance on the other side of said crystal holding means for receiving the widely divergent deflected rays, said target and said crystal holding means being so supported that the secondary rays are permitted to pass through an unobstructed field from the crystal to the target.

23. Apparatus for identifying a crystal of a type having a plurality of angularly disposed surfaces capable of deflecting a single incident ray of light into a plurality of secondary rays of light at widely divergent angles with each other comprising means for holding the crystal, a pair of targets positioned at opposite sides of said crystal holding means at predetermined distances therefrom, one of said targets having an aperture therein and substantially central thereof, and means for sending a ray of light through said aperture to said crystal whereby secondary rays may be deflected to both of said targets, said crystal holding means and said targets being so supported as to permit the secondary rays to pass through uninterrupted fields from the crystal to the targets.

In testimony whereof I affix my signature.

FAYETTE F. READ.